US008861383B2

(12) United States Patent
Pandey et al.

(10) Patent No.: US 8,861,383 B2
(45) Date of Patent: Oct. 14, 2014

(54) ACQUIRING A SIGNAL PARAMETER FOR A NEIGHBORING ACCESS POINT

(75) Inventors: Santosh Pandey, Santa Clara, CA (US); Allan Thomson, Pleasanton, CA (US); Brian Hart, Sunnyvale, CA (US); Jagdish Girimaji, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 990 days.

(21) Appl. No.: 12/689,840

(22) Filed: Jan. 19, 2010

(65) Prior Publication Data

US 2011/0176434 A1 Jul. 21, 2011

(51) Int. Cl.
| | | |
|---|---|---|
| *G01R 31/08* | (2006.01) | |
| *H04W 48/16* | (2009.01) | |
| *H04W 64/00* | (2009.01) | |
| *H04W 36/08* | (2009.01) | |

(52) U.S. Cl.
CPC .............. *H04W 48/16* (2013.01); *H04W 64/00* (2013.01); *H04W 36/08* (2013.01)
USPC .......................................... 370/252; 370/331

(58) Field of Classification Search
USPC ................................................. 370/252, 331
See application file for complete search history.

(56) References Cited

U.S. PATENT DOCUMENTS

| | | | | |
|---|---|---|---|---|
| 6,072,987 | A * | 6/2000 | Willey ........................ | 340/7.43 |
| 6,879,567 | B2 * | 4/2005 | Callaway et al. ............. | 370/311 |
| 2003/0179731 | A1 * | 9/2003 | Noguchi et al. ............... | 370/331 |
| 2007/0014267 | A1 | 1/2007 | Lam et al. | |
| 2008/0130604 | A1 * | 6/2008 | Boyd ............................ | 370/338 |
| 2013/0242835 | A1 * | 9/2013 | Seok ............................ | 370/311 |

FOREIGN PATENT DOCUMENTS

EP         1347614 A2     9/2003

OTHER PUBLICATIONS

International Preliminary Report on Patentability for PCT/US/11/21091 dated Aug. 2, 2012.
IEEE P802.11v/D6.01 Draft Standard for Information Technology-Telecommunications and Information Exchange Between systems, Jul. 2009, p. 60-61 and p. 250.
"An 802.11k Compliant Framework for Cooperative Handoff in Wireless Networks" http://www.hindawi.com/journals/wcn/2009/350643.html, 2009 George Athanasiou et al.
IEEE 802.11k Standard for Information Technology, Telecommunications and Information exchange between systems, Jun. 12, 2008, p. 60-61.
PCT/US11/21091 International Search Report and Written Opinion of the International Searching Authority dated May 2, 2011.

* cited by examiner

*Primary Examiner* — Mark Rinehart
*Assistant Examiner* — Matthew Hopkins
(74) *Attorney, Agent, or Firm* — Tucker Ellis LLP

(57) ABSTRACT

In an example embodiment, a wireless device is configured to associate with a first access point on a first frequency. The wireless device listens for a predefined frame, which may be sent by neighboring access points or other wireless devices. When the wireless device receives a signal comprising a predefined frame, the wireless device acquires a parameter, such as signal strength, for the signal. The wireless device sends the parameter for the signal to the first access point.

23 Claims, 3 Drawing Sheets

ACQUIRING A SIGNAL PARAMETER FOR A NEIGHBORING ACCESS POINT

TECHNICAL FIELD

The present disclosure relates generally to wireless devices.

BACKGROUND

In a wireless local area network (WLAN) environment, neighboring access points (APs) are assigned different channels to avoid co-channel interference. Currently, 802.11 clients perform off-channel scanning to find neighboring off-channel APs. Some wireless applications, such as location determination, require a measurement, such as received signal strength indication (RSSI), Angle of Arrival (AOA), Time of Arrival (TOA), and/or Time Difference of Arrival (TDOA) from neighboring APs. Clients may perform off-channel packet transmission and/or reception in order for these applications to have greater information, for example to determine the client's location with greater accuracy. For example, in some cases, clients go off-channel to receive packets such as an AP's beacon and to record an RSSI reading from that AP. As another example, a client may go off-channel to transmit a packet, such as a probe request or a location track notification packet, enabling neighboring APs that receive the packet to determine an RSSI, TOA, AOA, etc. for the client.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
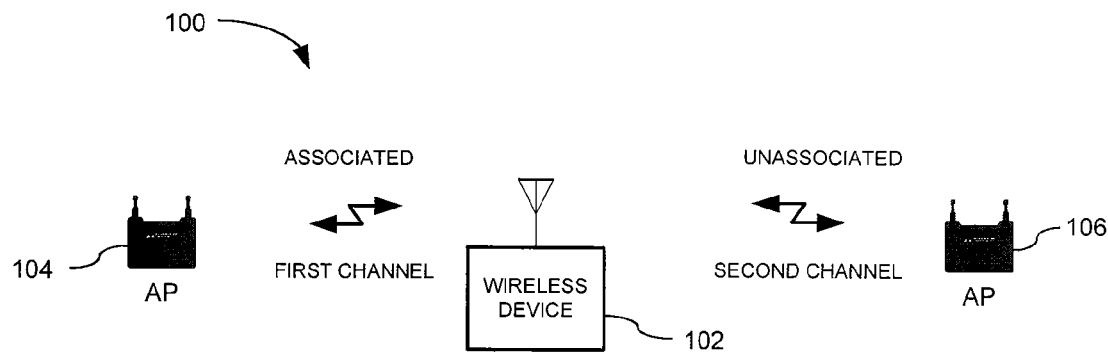
FIG. 1 illustrates an example of a wireless network upon which an example embodiment may be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a wireless transceiver and control logic communicatively coupled to the wireless transceiver and configured to communicate with other wireless devices via the wireless transceiver. The control logic is configured to associate with a first wireless device. The control logic is configured to determine a parameter of a predetermined signal received via the wireless transceiver from a second wireless device. The control logic is further configured to send data representative of the parameter to the first wireless device via the wireless transceiver.

In accordance with an example embodiment, there is disclosed herein a method comprising a wireless device associating with a first access point. The wireless device receives a signal from a second access point. The wireless device determines whether the signal received from the second access point is a predefined signal. If the signal is a predefined signal, the wireless device acquires a parameter for the signal. The wireless device sends the parameter for the signal to the first access point.

In accordance with an example embodiment, there is disclosed herein logic encoded in a tangible media and when executed operable to associate with a first wireless access point. The logic receives data representative of a signal from a second access point. The logic determines whether the data representative of a signal indicates that the signal is a predefined signal. The logic acquires a parameter for the signal responsive to determining the signal is a predefined signal. The logic acquires a Medium Access Control (MAC) address for a source of the signal. The logic sends the MAC address and the parameter for the signal to the first access point.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, neighboring APs transmit a neighbor packet, such as an inter-AP management packet, fake beacon (which will be described in more detail herein infra), or other suitable packet on the client's associated channel to enable clients to measure RSSIs from neighboring APs. When an AP transmits this additional neighbor packet, the client records the RSSI and the MAC address. The client may then transmit the information (RSSI, AP MAC address and other related parameters) directly to the associated AP or report multiple records periodically. The information may be transmitted by the client using a management packet and/or a proprietary frame.

In an example embodiment, an AP transmits the fake beacon on a non-serving channel. Any client beacon reporting mechanisms (for example the S36 beacon request/report defined in Cisco Compatible Extension version 2 "CCXv2" available from Cisco Systems, Inc., 170 West Tasman Dr., San Jose, Calif. and/or a beacon request/report defined in the Institute of Electrical and Electronics Engineers (IEEE) 802.11k specification "11k") can be used. For example, a packet formatted similar to an 11k beacon request/report can provide a list of APs to the client with no client action implied; however, the client is responsive to the packet to report all beacons detected from APs on the list A fake beacon, or an irregularly transmitted beacon, can be formatted the same way as a normal beacon, yet crafted to prevent naive clients from trying to associate with the AP sending the beacon, e.g. by using a hidden SSID and/or an obscure, strong security mode.

In an example embodiment, the AP requests that one or more clients send the RSSIs collected. If fake beacons are used as a means to provide off channel neighboring AP measurements then a CCX/11k beacon request can be used. Alternatively, a predefined management frame can be used then to provide the parameter(s) of interest for such packets. In particular embodiments, the 11k Frame Request mechanism makes parallel requests for the RSSI of frames of a list of specific MAC addresses (of the neighboring APs) on a specific channel (such as the associated channel). In another embodiment, the 11k Frame Request mechanism makes serial requests (or a combination of serial and parallel requests) for the RSSI of frames of a specific MAC address (of the neighboring APs) on a specific channel (such as the associated channel), with the timing of the sequence of requests chosen to align with the off-channel transmission schedule of those APs.

The AP can ensure that the client can identify a packet of interest using one or more of the following
mechanisms (or any other suitable configuration mechanism available for client provisioning):

Watch list of MAC addresses can be sent from associated AP, e.g. 11k frame request, or, if additional semantics are defined ("this bit is set to signify the neighbor list is actually/also a watch list"), an 11k neighbor list. Note MAC address may be of devices other than APs;

If so commanded by the AP, the device itself can create a list of off/on channel AP MAC addresses by monitoring packets such as beacons received during its (infrequent) periodic off-channel scanning; or the device can perform this function autonomously If so commanded by the AP, by monitoring a predefined frame format, (Note that some of inter AP packets formats may not work if they are encrypted;

All beacons packets (e.g. if so commanded by the AP via a beacon request);

Fake beacon packets, as defined above (e.g. if so commanded by the AP via a beacon request).

The set of source MAC address that the client may monitor can be extended to devices other than APs. For example, clients can be asked by their associated AP to monitor other Wi-Fi devices which periodically send packets of interest such as other Wi-Fi Sensors, radio frequency identification tags (including WiFi tags), (Lightweight Access Point Protocol) LWAPP compatible APs, etc.

Although the example embodiments herein use RSSI for determining location, those skilled in the art should readily appreciate that the principles described herein are also applicable for location systems that are based on other measurements such as TDOA, TOA etc. Neighbor AP RSSIs can also be used by clients to augment their off-channel scanning information without the clients changing channels. Providing updated RSSIs from neighboring APs can help nomadic clients determine the best candidate APs to associate. This RSSI update can complement CCX/11k neighbor reports and 802.11v (11v) BSS (Basic Service Set) transition management frames FIG. 1 illustrates an example of a wireless network 100 upon which an example embodiment may be implemented. In the illustrated example, there are two access points 104, 106 and a wireless device 102, which in this example is a mobile device that is capable of receiving signals from access points 104, 106. In the illustrated example, wireless device 102 is associated with the access point 104 and operates on a first channel. Access point 106 is a neighboring access point that does not have wireless device 102 associated with it (unassociated) and AP 106 communicates (e.g., has other wireless devices associated with it) on a second channel. Note that the number and location of access points and wireless devices was selected for the purpose of illustrating example embodiments herein and those skilled in the art can readily appreciate that a network may suitably comprise any physically realizable number of access points and mobile wireless devices.

Figure 3:
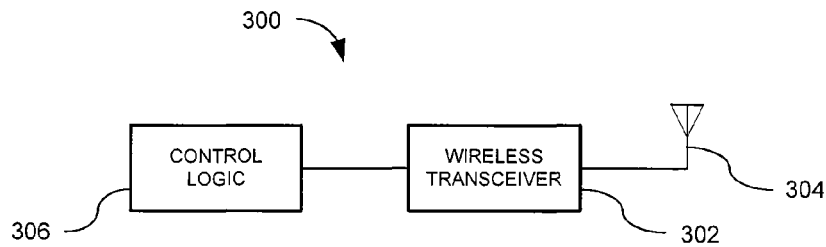
FIG. 3 illustrates an example of a wireless device upon which an example embodiment may be implemented.
Figure 4:
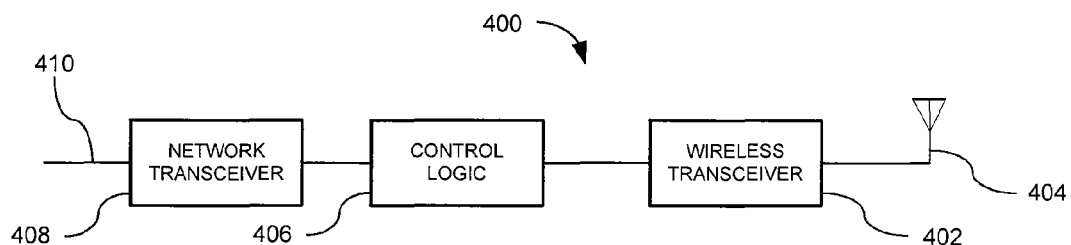
FIG. 4 illustrates an example of a wireless device upon which an example embodiment may be implemented with a network transceiver.

As will be described in more detail herein infra, wireless device 102 and access points 104, 106 suitably comprise logic for performing the functionality described in the example embodiments herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. FIG. 3 illustrates an example configuration for wireless device 102 and FIG. 4 illustrates an example configuration for access points 104, 106.

In order to eliminate or reduce the amount of time wireless device 102 spends off channel (that is off the first channel that it uses to communicate with access AP 104), AP 106 sends a signal comprising a packet on the first channel. The packet may be sent periodically or aperiodically. Wireless device 102 is configured to recognize the packet sent by AP 106 and to measure a parameter or parameters of the signal that was received from AP 106. In an example embodiment, the parameter comprises a received signal strength indication (RSSI). In another example embodiment, the parameter comprises time of arrival (TOA). In still yet another example embodiment, the parameter comprises an Angle of Arrival (AOA). Wireless device 102 then sends data representative of the measured parameter to AP 104. In particular embodiments, wireless device 102 is further configured to determine an identifier (e.g. source address such as a Medium Access Control (MAC) address, for the source and/or include other data such as received timestamp, sequence number, and/or a combination of these identifiers) for the source of the signal and to send the identifier along with the data representative of the measured parameter to AP 104.

In an example embodiment, wireless device 102 is configured to identify the predetermined signal based on frame type. For example, wireless device may be configured to detect a fake beacon sent by AP 106. As another example, wireless device 102 may look for a predefined frame format, such as a predefined management frame or a frame with a specific destination multicast address.

In an example embodiment, wireless device 102 is configured to identify the predetermined signal based on source address. For example, during, or after, association, AP 104 may send wireless device 102 a list of MAC addresses for neighboring APs, or other types of wireless devices. If wireless device 102 receives a packet from a device on the list, wireless device 102 sends a parameter of the signal to AP 104.

In an example embodiment, wireless device 102 switches to the second channel and listens for other wireless devices. Wireless device 102 may switch to the second channel at periodic or aperiodic intervals. Wireless device 102 may record identifiers, such as MAC addresses, for other wireless devices detected on the second channel. In particular embodiments, wireless device 102 may listen for beacons from APs on the second channel and record the MAC addresses of the APs sending the beacons. Wireless device 102 switches back to the first channel. If wireless device 102 detects a packet sent from a wireless device (e.g., AP) that wireless device 102 detected on the second channel, wireless device 102 measures a parameter of the signal that conveyed the packet and sends data representative of the parameter to AP 104.

In an example embodiment, wireless device 102 may be configured to transmit a signal in response to receiving the predetermined signal. This allows APs 104, 106 to measure a signal sent by wireless device 102. The predetermined signal may be sent by either AP 104 and/or 106. For example, if AP 104 knows that AP 106 is currently on the first channel (that is AP 104 is off-channel from its operating channel), AP 104 may send a predetermined packet to wireless device 102, and wireless device 102 transmits a signal in response to the packet, allowing both AP 104 and 106 to measure a signal sent from wireless device 102.

In an example embodiment, the wireless device also sends data representative of the signal parameter for signals received from AP 104. For example, wireless device 102 may send data representative of signal strengths of signals wireless device received from AP 104 and AP 106 received on the first channel to AP 104. The data representative of the signal parameter for a signal wireless device received from AP 104 and the data representative of the signal parameter for a signal wireless device received from AP 106 may be sent together in the same signal, and/or separately in separate signals.

In an example embodiment, AP 104 measures the signal parameter from a signal sent by wireless device 102. For example, wireless device 102 sends the measured signal strength as measured by wireless device 102 for AP 106 to AP 104, whereupon AP 104 measures the signal strength of the signal sent by wireless device 102 reporting the measured signal strength of AP 106.

In an example embodiment, wireless device 102 operates in a power save mode. In the power save mode of an example embodiment, wireless device 102 is unable receive signals. In particular embodiments, AP 104 provides wireless device 102 with data indicating when AP 106 is scheduled to transmit, thus allowing wireless device 102 to enter power save mode until the scheduled transmission time. In an example embodiment, APs 104, 106 coordinate times that AP 106 transmits on the first channel. For example, a power save technique may involve waking up to receive a DTIM beacon and subsequent groupcast traffic and staying awake until the More Data bit for the wireless devices is cleared & wireless devices can return to power save mode. AP 104 may send DTIM beacons and subsequent groupcast that cause wireless stations, including wireless device 102, to stay awake, and AP 106 may transmit after AP 104's DTIM beacon and before AP 104 sends a frame with the More Data bit set to 0. In another example embodiment, AP 104 may send a beacon request or frame request with data indicating a time when AP 106 will be on the first channel so that the power save stations (such as wireless device 102) can wake up accordingly.

Figure 2:
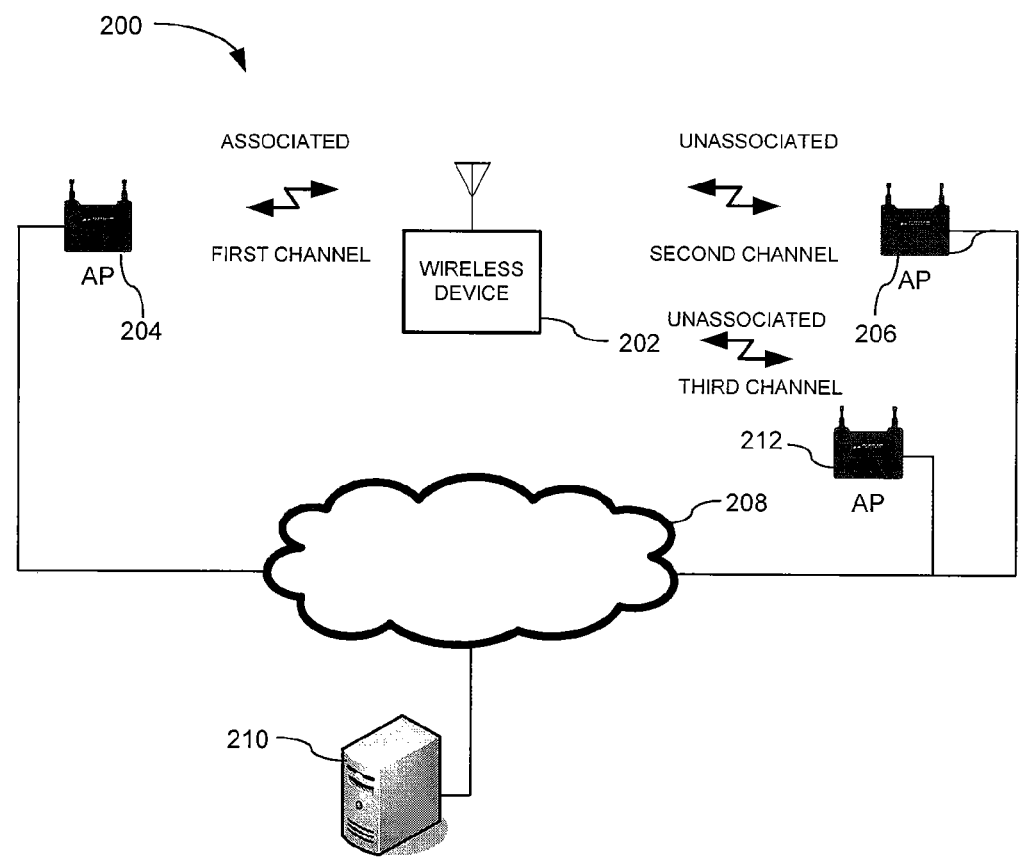
FIG. 2 illustrates an example of a wireless network upon which an example embodiment may be implemented that further comprises a server.

FIG. 2 illustrates an example of a wireless network 200 upon which an example embodiment may be implemented that further comprises a server 210. For example, server 210 may be a location server employed by network 200 for determining the location of wireless device 202. In this embodiment, wireless device is associated with AP 204 on a first channel. AP 206 is a neighboring AP and associates with wireless devices on a second channel, but is capable of operating on the first channel. AP 212 is a neighboring AP and associates with wireless devices on a third channel (although in other example embodiments AP 212 may also associate with wireless devices on the second channel) but is capable of operating on the first channel. APs 204, 206, 212 are coupled to server 210 via network 208. Network 208 may suitably comprise wired, wireless, and/or a combination of wired and/or wireless segments. Server 210 can determine the location of wireless device 202 based on measurements of signals wireless device 202 received from neighboring access points In order to eliminate or reduce the amount of time wireless device 202 spends off channel (that is off the first channel that it uses to communicate with access AP 204), AP 206 and AP 212 each send a signal comprising a packet on the first channel. The packet may be sent periodically or aperiodically. Wireless device 202 is configured to recognize predetermined packets sent by APs 206, 212. Wireless device 202 upon receiving a signal comprising the predetermined packet from AP 206 and/or AP 212 measures a parameter of the signal. In an example embodiment, the parameter comprises a received signal strength indication (RSSI). In another example embodiment, the parameter comprises time of arrival (TOA). In still yet another example embodiment, the parameter comprises an Angle of Arrival (AOA). Wireless device 202 then sends data representative of the measured parameter to AP 204. In particular embodiments, wireless device 202 is further configured to determine an identifier (e.g. source address such as a Medium Access Control (MAC) address, timestamp sequence number, and/or a combination of these) for the source of the signal (e.g., AP 206 or AP 212) and to send the identifier along with the data representative of the measured parameter to AP 204.

In an example embodiment, wireless device 202 is configured to identify the predetermined signal based on frame type. For example, wireless device may be configured to detect a fake beacon sent by either AP 206 and/or AP 212. As another example, wireless device 202 may look for a predefined frame format, such as a predefined management frame.

In an example embodiment, wireless device 202 is configured to identify the predetermined signal based on source address. For example, during, or after, association, AP 204 may send wireless device 202 a list of MAC addresses for neighboring APs, or other types of wireless devices. For example, the list may contain the MAC addresses of APs 206 and 212 if wireless device 202 receives a packet from a wireless device on the list wireless device 202 sends a parameter of the signal to AP 204.

In an example embodiment, wireless device 202 switches to the second channel and listens for other wireless devices. Wireless device 202 may also switch to the third channel to listen for other wireless devices. Wireless device 202 may switch to the second channel and/or third channel at periodic or aperiodic intervals. Wireless device 202 may record identifiers, such as MAC addresses, for other wireless devices detected on the second channel. In particular embodiments, wireless device 202 may listen for beacons from APs on the second channel and record the MAC addresses of the APs sending the beacons. Wireless device 102 switches back to the first channel. If wireless device 202 detects a packet sent from a wireless device (e.g., AP) that wireless device 202 detected on the second channel, wireless device 202 measures a parameter of the signal that conveyed the packet and sends data representative of the parameter to AP 204. Similarly, if wireless device 202 detects a packet sent from a wireless device (e.g., AP) that wireless device 202 detected on the third channel, wireless device 202 measures a parameter of the signal that conveyed the packet and sends data representative of the parameter to AP 204

In an example embodiment, wireless device 202 may be configured to transmit a signal in response to receiving the predetermined signal. This allows APs 204, 206, 212 to measure a signal sent by wireless device 202. The predetermined signal may be sent by either AP 104 and/or 106. For example, if AP 204 knows that AP 206 and/or AP 212 is currently on the first channel (that is AP 206 and/or AP 212 are off-channel), AP 204 AP 206, and/or AP 212 may send a predetermined packet to wireless device 202, and wireless device 202 transmits a signal in response to the packet, allowing AP 204, 206 and 212 to measure a signal sent from wireless device 202.

In an example embodiment, wireless device also sends data representative of the signal parameter for signals received from AP 204. For example, wireless device 202 may send data representative of signal strengths of signals wireless device received from AP 204 and AP 206 received on the first channel to AP 204. The data representative of the signal parameter for a signal wireless device received from AP 204 and the data representative of the signal parameter for a signal wireless device received from AP 206 may be sent together in the same signal, and/or separately in separate signals.

In an example embodiment, AP 204 measures the signal parameter from a signal sent by wireless device 202. For example, wireless device 202 sends the measured signal strength as measured by wireless device 202 for AP 206 and/or AP 212 to AP 204, whereupon AP 204 measures the signal strength of the signal sent by wireless device 202 reporting the measured signal strength of AP 206 and/or 212.

In an example embodiment, AP 204 sends data representative of the signal parameter measured by wireless device 202 of signals received from AP 204, AP 206 and/or AP 212 to server 210 via network 208. This can allow server 210 to determine the location wireless device 202. For example, server 210 can determine the location of wireless device 202 based on signal strength data (such as RSSI); AOA, TOA, and/or TDOA data received from wireless device 202 and/or APs 204, 206, 212.

FIG. 3 illustrates an example of a wireless device 300 upon which an example embodiment may be implemented. Wireless device 300 is suitable for implementing the functionality of wireless device 102 (FIG. 1) and/or wireless device 202 (FIG. 2). Wireless device 300 comprises a wireless transceiver 302 operable to send and receive signals via antenna 304. Control logic 306 is coupled to wireless transceiver 302 and configured to receive data via wireless transceiver 302, including data from wireless transceiver about parameters of signals received by transceiver 302. Control logic is further configured to send data to other wireless devices via wireless transceiver 302.

In an example embodiment, control logic 306 is configured to associate with a first wireless device by exchanging signals via wireless transceiver 302. Control logic 306 is configured to determine a parameter of a predetermined signal received from a second wireless device via wireless transceiver 302. Control logic 306 is configured to send data representative of the parameter to the first wireless transceiver.

In an example embodiment, the first wireless device is a first access point operating on a first frequency, and the second wireless device is a second access point operating on a second frequency; however, the second access point is configured to send the predetermined signal on the first frequency.

In an example embodiment, the parameter comprises a received signal strength indication. In another example embodiment, the parameter comprises a time of arrival. In yet another example embodiment, the parameter comprises an angle of arrival.

In an example embodiment, control logic 306 is further configured to determine an identifier for the source of the predetermined signal. In particular embodiments, control logic 306 is further configured to send data representative of the identifier with the data representative of the parameter. For example, the identifier may comprise a Medium Access Control address.

In an example embodiment, the predetermined signal is a fake beacon. In another example embodiment, the predetermined signal is a predefined management frame. In yet another example embodiment, control logic 306 receives a list of identifiers for wireless devices from the first wireless device for determining whether a signal received via the wireless transceiver is a predetermined signal.

In an example embodiment, control logic 306 is configured to switch the wireless transceiver 302 to the second channel and listen for wireless devices operating on the second channel. Control logic 306 is configured to record identifiers for wireless devices detected operating on the second channel. Control logic 306 is further configured to switch the wireless transceiver to the first channel, determines that a signal received from a source having an identifier matching an identifier recorded on the second channel is a predetermined signal. Control logic 306 may be configured to switch the wireless transceiver 302 to the second channel at periodic and/or aperiodic intervals.

In an example embodiment, control logic 306 is configured to switch wireless transceiver 302 to the second channel and listen for beacons from access points operating on the second channel. Control logic 306 is configured to record identifiers for access points detected operating on the second channel. Control logic 306 is further configured to switch wireless transceiver 302 to the first channel, and determines that a signal received from a source having an identifier matching an identifier for an access point recorded on the second channel is a predetermined signal.

In an example embodiment, control logic 306 is configured to transmit a predetermined response signal via wireless transceiver 302 responsive to the predetermined signal. The signal may comprise a data packet, for example a predefined packet, such as an acknowledgement (ACK).

FIG. 4 illustrates an example of a wireless device 400 with a network transceiver 408 upon which an example embodiment may be implemented. Wireless device 400 is suitable to implement the functionality described herein for AP 104 (FIG. 1), AP 106 (FIG. 1), AP 204 (FIG. 2), AP 206 (FIG. 2), and/or AP 212 (FIG. 2). For example wireless transceiver may send and receive wireless signals via antenna 404 to communicate with other wireless devices. Control logic 406, which is configured to send and receive data via wireless transceiver 402, and to acquire signal parameter data from wireless transceiver 402, can associate with wireless devices. Data received from the wireless devices may be forwarded onto a network via network transceiver 408 and network link 410. Network transceiver 408 and network link 410 may suitably be any wired or wireless technology. Similarly, control logic 406 may receive data for associated wireless devices via network transceiver 408, which is forwarded to the associated wireless device via wireless transceiver 402.

In an example embodiment, control logic 406 is configured to receive data from associated wireless devices comprising signal parameter data. Control logic 406 may process the signal parameter data (for example in a small local area network "LAN" an AP may also function as a location server), and/or may forward the data to a device coupled to a network coupled to network link 410 (for example the data may be forwarded to a location server). In particular embodiments, the signal parameter data comprises data identifying a source of the signal(s) such as MAC addresses.

In an example embodiment, control logic 406 is configured to switch wireless transceiver 402 to a second channel. While on the second channel, control logic 406 may send a predefined signal. In an example embodiment, the predefined signal is a fake beacon. In another example embodiment, the predefined signal is a predefined management frame, such as an Inter-AP Protocol (IAPP) packet. In yet other example embodiments, control logic may send a combination of fake beacons and/or management frames. This can enable mobile wireless devices to acquire signal parameters (such as signal strength, RSSI, AOA, TOA, TDOA, etc.) without having to perform off-channel scanning. After sending the predetermined signal(s), control logic 406 may switch wireless transceiver 402 back to the original channel. Control logic 406 may be configured to switch to the second channel at periodic or aperiodic intervals.

Figure 5:
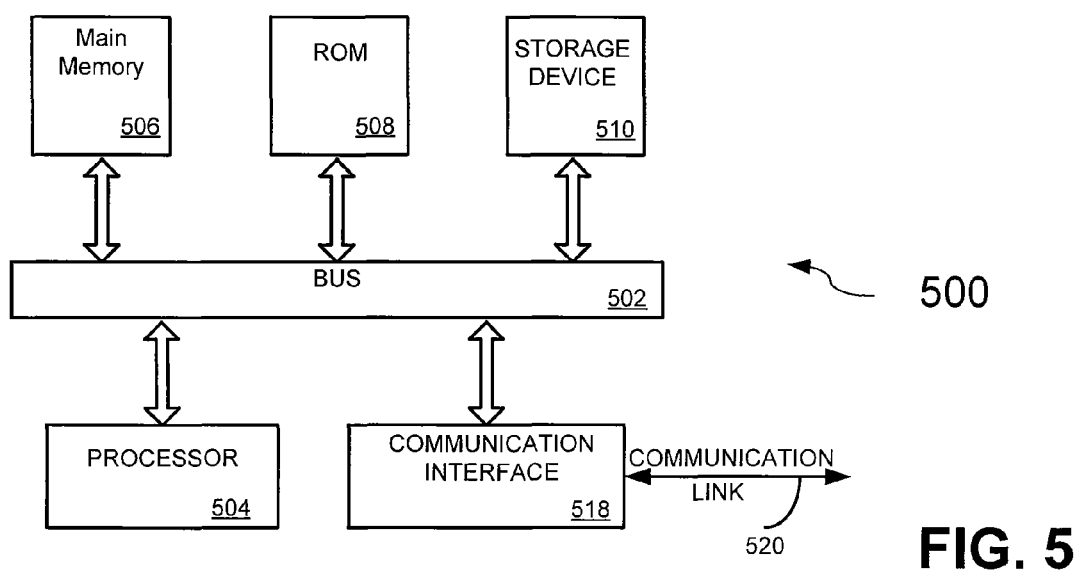
FIG. 5 illustrates an example of a computer system upon which an example embodiment may be implemented.

FIG. 5 illustrates an example of a computer system 500 upon which an example embodiment may be implemented. Computer system 500 may be employed to implement control logic 306 described in FIG. 3, control logic 406 described in FIG. 4, and/or to implement methodology 600 that will described herein infra.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the example embodiment is related to the use of computer system 500 for acquiring a signal parameter for a neighboring access point. According to an example embodiment, acquiring a signal parameter for a neighboring access point is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include for example optical or magnetic disks, such as storage device 510. Volatile media include dynamic memory such as main memory 506. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 500 also includes a communication interface 518 coupled to bus 502. Communication interface 518 provides a two-way data communication coupling computer system 500 to a communication link 520. Communication link 520 may be a wired or wireless communication link. In particular embodiments, computer system 500 comprises a plurality of communication interfaces 518 (not shown). For example, in an access point configuration one communication interface 518 may be a wireless transceiver employed for communicating with wireless devices and a second communication interface 518 may be coupled to a network. The second communication interface may be a wired communication interface (for example an Ethernet network interface card "NIC") or a wireless communication interface (for example a Mesh backhaul connection).

Figure 6:
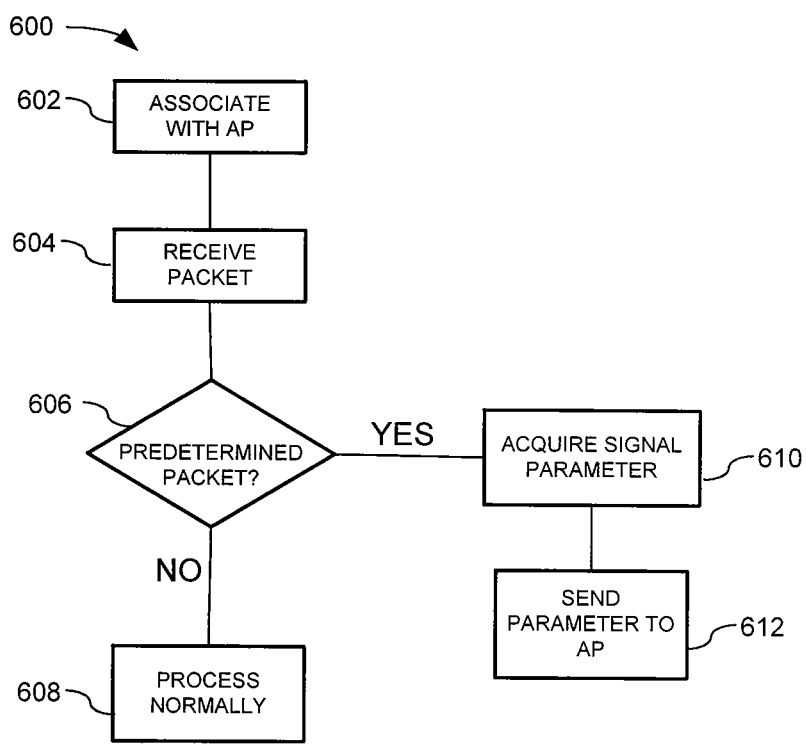
FIG. 6 illustrates an example of a methodology in accordance with an example embodiment.

In view of the foregoing structural and functional features described above, a methodology in accordance with an example embodiment will be better appreciated with reference to FIG. 6. While, for purposes of simplicity of explanation, the methodology of FIG. 6 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of an example embodiment. The methodology described herein is suitably adapted to be implemented in hardware, software, or a combination thereof.

FIG. 6 illustrates an example of a methodology 600 in accordance with an example embodiment. Methodology may be implemented by wireless device 102 (FIG. 1), wireless device 202 (FIG. 2), control logic 302 (FIG. 3) and/or computer system 500 (FIG. 5).

At 602, a wireless device associates with an access point. The wireless device and access point communicate on a first wireless channel. In an example embodiment, either during or after association has occurred, the access point sends the wireless device a list of identifiers, such as MAC addresses, timestamps, sequence numbers, and/or a combination of these, of wireless devices of interest. Any signal or packet received from a wireless device on the list will be considered a predetermined packet.

At 604, the wireless device receives a signal comprising a packet from a second wireless device. In an example embodiment, the second wireless device is a neighboring access point that has associated wireless devices on a second channel; however, the neighboring access point goes off channel at period or aperiodic intervals and transmits a signal on the first channel, enabling the wireless device to measure a parameter of the signal.

At 606, the wireless device determines whether the packet is a predetermined packet. In an example embodiment, the wireless device determines the packet is a predetermined packet based on the packet format. For example, the packet may be a fake beacon. As another example, the packet may have a predefined format, such as a predefined management frame, or an Inter-Access point Protocol (IAPP) packet.

In an example embodiment, the wireless device determines whether the packet is a predetermined packet based on the source address of the packet. For example, the wireless device may receive a list of device addresses from the associated access point. If a packet is received from a source whose address matches an address on the list, the wireless device determines the packet is a predetermined packet.

If at 606, the mobile wireless device determines that the packet is not a predetermined packet (NO), at 608, the packet is processed normally. For example, if the packet is not addressed to the wireless device it can discard the packet; however, if the packet is addressed to the wireless device the mobile device may send an acknowledgement (ACK) for the packet and perform any other processing.

If at 606, the wireless device determines that the packet is a predetermined packet (YES), at 610 the wireless device acquires (e.g., measures) a parameter of the signal conveying the packet. The parameter may include, but is not limited to signal strength (such as received signal strength indication "RSSI"), time of arrival (TOA), angle of arrival (AOA), or a combination of the aforementioned parameters. In particular embodiments, the wireless device determines an address (such as a MAC address) of the source of the predetermined packet.

At 612, the wireless device sends the acquired signal parameter to the associated access point (AP). In an example embodiment, the wireless device also sends the address of the source of the signal. The wireless device may also send other data such as a timestamp and/or sequence number.

In particular embodiments, the wireless device also sends an acquired signal parameter for a signal received from the associated access point. The signal parameter for the associated access point may be sent with the signal parameter of the predetermined packet or may be sent separately. For example, the wireless device may periodically, or aperiodically, send data representative of a measured signal parameter of signals received from the associated access point.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a wireless transceiver;
      control logic communicatively coupled with the wireless transceiver, the control logic being configured to communicate with a plurality of associated wireless devices via the wireless transceiver;
      wherein the control logic is configured to establish a communication link with a first associated wireless device;
      wherein the control logic is configured to receive coordinated schedule data representative of a scheduled transmission time of transmission of one or more wireless signals by a second associated wireless device, wherein the first and second associated wireless devices coordinate a transmission schedule comprising the scheduled transmission time;
      wherein the control logic is configured to selectively transition the apparatus between a power save mode and an active mode, wherein the apparatus in the power save mode is unable to receive selected wireless signals and wherein in the active mode the apparatus is able to receive the selected wireless signals;
      wherein the control logic transitions the apparatus to the active mode in accordance with the received coordinated schedule data of the second associated wireless device;
      wherein, in the active mode, the wireless transceiver receives a signal from the second associated wireless device at the scheduled transmission time wherein the control logic is configured to determine whether a selected packet contained in the signal received from the second associated wireless device is a predetermined packet;
      wherein the control logic is configured to determine, responsive to determining the selected packet contained in the signal received from the second associated wireless device is the predetermined packet, a parameter of the signal received via the wireless transceiver from a second wireless device; and
      wherein the control logic is configured to send data representative of the parameter to the first wireless device via the wireless transceiver.

2. The apparatus according to claim 1, wherein the first wireless device is a first access point operating on a first frequency;
   wherein the wireless transceiver communicates with the first access point on the first frequency; and
   wherein the second wireless device is a second access point configured to communicate primarily on a second frequency, and is further configured to send the signal on the first frequency.

3. The apparatus according to claim 1, wherein the parameter comprises a received signal strength indication.

4. The apparatus according to claim 1, wherein the parameter comprises a time of arrival.

5. The apparatus according to claim 1, wherein the parameter comprises an angle of arrival.

6. The apparatus according to claim 1, wherein the control logic is further configured to determine an identifier of a source of the signal.

7. The apparatus according to claim 6, wherein the control logic is further configured to send data representative of the identifier with the data representative of the parameter.

8. The apparatus according to claim 7, wherein the identifier comprises a selected one of a group consisting of a Medium Access Control address, a timestamp, and a sequence number.

9. The apparatus according to claim 1, wherein the predetermined packet is a fake beacon.

10. The apparatus according to claim 1, wherein the predetermined packet is a predefined management frame.

11. The apparatus according to claim 1, wherein the control logic receives a list of identifiers for wireless devices from the first wireless device for determining whether a signal received via the wireless transceiver is a predetermined signal.

12. The apparatus according to claim 11 wherein the control logic is configured to switch the wireless transceiver to the second channel and listen for wireless devices operating on the second channel;
   wherein the control logic is configured to record identifiers for wireless devices detected operating on the second channel; and
   wherein the control logic is further configured to switch the wireless transceiver to the first channel; and
   wherein the control logic determines that a signal received from the second wireless device is a predetermined signal based on matching an identifier recorded on the second channel to the second wireless device.

13. The apparatus according to claim 12, wherein the control logic periodically switches the wireless transceiver to the second channel.

14. The apparatus according to claim 1, wherein the control logic is configured to switch the wireless transceiver to the second channel and listen for beacons from access points operating on the second channel;
   wherein the control logic is configured to record identifiers for access points detected operating on the second channel; and
   wherein the control logic is further configured to switch the wireless transceiver to the first channel; and
   wherein the control logic determines that a signal received from the second wireless device having an identifier matching an identifier for an access point recorded on the second channel is a predetermined signal.

15. The apparatus according to claim 14, wherein:
   the control logic is configured to determine a parameter of the signal received from the second wireless device; and,
   the control logic is configured to send data representative of the parameter of the signal received from the second wireless device to the first wireless device via the wireless transceiver.

16. The apparatus according to claim 1, wherein:
   the control logic is configured to receive via the transceiver from the first associated wireless device data representative of an end of a signal transmission time period; and
   wherein the control logic is configured to selectively transition the apparatus from the active mode to the power save mode responsive to receiving the data representative of the end of a signal transmission time period.

17. A method, comprising:
   associating with a first access point;
   receiving coordinated schedule data representative of a scheduled transmission time of transmission of one or more wireless signals by a second access point, wherein the first and second access points coordinate a transmission schedule comprising the scheduled transmission time;
   selectively transitioning, in accordance with the schedule data of the second access point, from a power save mode wherein signals are unable to be received to an active mode wherein signals are able to be received;
   in the active mode, receiving at the scheduled transmission time a signal from the second access point in accordance with the schedule data;
   determining whether a selected packet contained in the signal is a predefined packet;
   acquiring a parameter for the signal responsive to determining the selected packet is the predefined packet; and
   sending the parameter for the signal to the first access point.

18. The method set forth in claim 17, further comprising determining an identifier for the second access point; and
   sending the parameter further comprises sending the identifier.

19. The method set forth in claim 18, wherein the identifier is a Medium Access Control address.

20. The method set forth in claim 17, wherein the parameter is a received signal strength indication.

21. The method set forth in claim 17, wherein
   the receiving the signal from the second access point comprises receiving the signal from the second access point exclusively at the scheduled transmission time in accordance with the schedule data.

22. A non-transitory computer readable medium, the non-transitory computer readable medium having instructions encoded thereon instructions for
   execution, and when executed operable to:
      associate with a first access point;
      receiving coordinated schedule data representative of a scheduled transmission time of transmission of one or more wireless signals by a second access point, wherein the first and second access points coordinate a transmission schedule comprising the scheduled transmission time;
      selectively transition, in accordance with the schedule data of the second access point, from a power save mode wherein signals are unable to be received to an active mode wherein signals are able to be received;
      in the active mode, receive at the scheduled transmission time a signal from the second access point in accordance with the schedule data;
      determining whether a packet contained in the signal indicates that the signal is a predefined signal;
      acquire a parameter for the signal responsive to determining the packet contained in the signal indicates that the signal is the predefined signal;
      acquire a Medium Access Control (MAC) address for a source of the signal; and
      sending the MAC address and the parameter for the signal to the first access point.

23. The non-transitory computer readable medium according to claim 22, and when executed further operable to:
   receive the signal from the second access point exclusively at the scheduled transmission time in accordance with the schedule data.

* * * * *